Patented May 6, 1952

2,595,928

UNITED STATES PATENT OFFICE 2,595,928

ANTIFOAM EMULSION

Chester C. Currie and Maurice C. Hommel, Midland, Mich., assignors to Dow Corning Corporation, Midland, Mich., a corporation of Michigan No Drawing. Application March 7, 1951, Serial No. 214,438

1 Claim. (Cl. 252—358)

This invention relates to a siloxane antifoam emulsion composition.

There are certain siloxanes which have proved to be highly successful antifoam agents for both aqueous and non-aqueous media. Normally, the antifoam is produced either in the form of a liquid or of a paste. Whereas these forms are highly useful for many applications, there is a need for an antifoam in the form of an emulsion. Such emulsions are of a particular value when used in connection with aqueous products. The primary requisitions of an antifoam emulsion are that the emulsion shall be stable, that it be capable of dilution without breaking and that it will prevent foaming in the diluted state.

It is an object of this invention to provide an emulsion which will prevent foaming of aqueous systems. Another object is to provide an antifoam composition which may be employed in conjunction with food products. Another object is to provide an antifoam emulsion which is stable in storage. Another object is to provide an antifoam emulsion which may be diluted with water without breaking.

The applicants have found that the above requirements are eminently satisfied by the following composition; from 3 to 12 per cent by weight of glycerylmonostearate; from 3 to 24 per cent by weight of a compound of the group polyoxyethylenestearate and propyleneglycol monolaurate; 2 to 40 per cent by weight of a benzene soluble methylpolysiloxane of at least 200 cps. viscosity at 25° C. which contains from 2 to 10 per cent by weight of a silica aerogel or fume silica; and from 24 to 95 per cent by weight water.

The siloxanes employed herein are methylpolysiloxanes of at least 200 cps. viscosity which are soluble in benzene. Preferably these methylpolysiloxanes contained from 1.9 to 2.1 methyl radicals per silicon atom. They may be prepared by any of the conventional methods for preparing siloxanes.

The siloxane composition herein employed must contain from 2 to 10 per cent by weight of either a silica aerogel or a fume silica. Silica aerogels are generally prepared by displacing the water in a hydrogel with an organic solvent and thereafter removing the solvent at a temperature above its critical temperature. Fume silicas are prepared by burning volatile silica compounds such as silicontetrachloride, trichlorosilane, ethylorthosilicate, and methylorthosilicate.

The antifoam compositions of this invention must contain from 3 to 12 per cent by weight of glycerylmonostearate and a total of from 2 to 24 per cent by weight of one or both of polyoxyethylenestearate and propyleneglycol monolaurate. These emulsifying agents when employed in the above concentrations produce emulsions which are stable indefinitely in storage and may be readily diluted with water when ready for use.

The emulsions may be prepared by mixing the siloxane and the emulsifying agents with a portion of the water in a colloid mill until a homogenous emulsion is formed and then adding the remainder of the water. The emulsions range from pastes to liquids depending upon the total amount of water employed.

The compositions of this invention are of particular value when used in defoaming food products. This is due to the fact that the emulsifying agents employed are non-toxic. However, it should be understood that the usefulness of these materials is by no means limited to the products of foods, but rather are effective in the defoaming of any aqueous medium. For example, the materials are excellent in the defoaming of latex.

The antifoaming ability of the materials of this invention was tested as follows: 100 cc. of a neoprene latex water emulsion was placed in a 500 ml. flask with an opening near the top. The latex was heated to 60–65° C. and vacuum was applied. The antifoam emulsion to be tested was made up to 2 per cent water solution and added to the latex. The number of milliliters of the 2 per cent water solution which stopped the latex from foaming under the above conditions was determined.

The following examples are illustrative only and should not be considered as limiting the scope of this invention:

Example 1

The siloxane employed in this example was a methylpolysiloxane which would barely flow at room temperature and which was soluble in benzene. The siloxane contained 7 per cent by weight of a silica aerogel. The siloxane was compounded with the emulsifying agents shown in the table below and with water in the amounts indicated by mixing the ingredients in a colloid mill. The emulsions thus prepared were tested for defoaming properties with the neoprene latex in the manner described above.

*Table I*

| Per cent by Weight Siloxane | Per cent by Weight Glyceryl Monostearate | Per cent by Weight Polyoxyethylene Stearate | Per cent by Weight Propylene Glycol Monolaurate | Per cent by Weight Water | cc. Required to Antifoam 100 cc. of Latex |
|---|---|---|---|---|---|
| 10 | 4 | 12 | 10 | 64 | 0.10 |
| 20 | 4 | 12 | 10 | 54 | 0.11 |
| 30 | 4 | 12 | 10 | 44 | 0.10 |
| 10 | 6 | 8 | 10 | 66 | 0.10 |
| 10 | 4 | 8 | 14 | 64 | 0.10 |
| 10 | 3 | 4 | 5 | 78 | .10 |
| 10 | 5 | 5 | 5 | 75 | .09 |
| 10 | None | 5 | 8 | 77 | No Good |
| 10 | 5 | None | 8 | 77 | .10 |
| 10 | 10 | None | 5 | 75 | .10 |
| 10 | 4 | 8 | None | 88 | .10 |
| 10 | 5 | 5 | None | 90 | .10 |

That which is claimed is:

An antifoam emulsion composed of from 3 to 12 per cent by weight of glycerylmonostearate from 3 to 24 per cent by weight of a compound selected from the group consisting of polyoxyethylene stearate and propylene glycol monolaurate, from 2 to 40 per cent by weight of a benzene soluble methylpolysiloxane of at least 200 cps. viscosity at 25° C. containing from 2 to 10 per cent by weight of a silica selected from the group consisting of silica aerogels and fume silicas and from 24 to 95 per cent by weight water.

CHESTER C. CURRIE.
MAURICE C. HOMMEL.

REFERENCES CITED

The following references are of record in the file of this patent:

UNITED STATES PATENTS

| Number | Name | Date |
|---|---|---|
| 2,349,585 | Bond | May 23, 1944 |
| 2,390,212 | Fritz | Dec. 4, 1945 |
| 2,416,504 | Trautman | Feb. 25, 1947 |